US012606461B2

(12) United States Patent
Kane et al.

(10) Patent No.: US 12,606,461 B2
(45) Date of Patent: Apr. 21, 2026

(54) SOLAR THERMAL BASED WATER TREATMENT SYSTEM FOR IMPURE AND INDUSTRIAL WASTEWATER

(71) Applicant: KANUDA AQUAPURE SOLUTIONS PRIVATE LIMITED, Maharashtra (IN)

(72) Inventors: Laxman Shridhar Kane, Pune (IN); Prabhakar Shridhar Kane, Pune (IN)

(73) Assignee: KANUDA AQUAPURE SOLUTIONS PRIVATE LIMITED (IN)

( * ) Notice: Subject to any disclaimer, the term of this patent is extended or adjusted under 35 U.S.C. 154(b) by 168 days.

(21) Appl. No.: 18/282,477

(22) PCT Filed: Mar. 15, 2022

(86) PCT No.: PCT/IN2022/050245
§ 371 (c)(1),
(2) Date: Sep. 15, 2023

(87) PCT Pub. No.: WO2022/195618
PCT Pub. Date: Sep. 22, 2022

(65) Prior Publication Data
US 2024/0140827 A1     May 2, 2024

(30) Foreign Application Priority Data

Mar. 16, 2021    (IN) .............................. 202121008767

(51) Int. Cl.
*C02F 1/14*          (2023.01)
*B01D 1/00*          (2006.01)
(Continued)

(52) U.S. Cl.
CPC .............. *C02F 1/14* (2013.01); *B01D 1/0035* (2013.01); *B01D 1/0058* (2013.01); *C02F 1/048* (2013.01);
(Continued)

(58) Field of Classification Search
CPC .... C02F 1/048; C02F 1/12; C02F 1/14; C02F 1/16; B01D 1/0035; B01D 1/0058
See application file for complete search history.

(56) References Cited

U.S. PATENT DOCUMENTS 4,363,703 A * 12/1982 ElDifrawi ................. C02F 1/14
                                                                202/180
5,207,869 A * 5/1993 Harmoning .......... B01D 1/0082
                                                                159/901
(Continued)

FOREIGN PATENT DOCUMENTS

CN          108751296 A     11/2018
FR          2 861 718 B1     3/2006

*Primary Examiner* — Jonathan Miller

(57) ABSTRACT

A solar thermal based water treatment system and a process for treating impure/industrial wastewater is disclosed. The solar thermal based water treatment system vaporizes impure/wastewater using incident solar radiations in a third unit with only air as a medium. The system has a fourth unit and a fifth unit for condensing water vapor and obtaining purified water in the form of condensate. The system also includes an eighth unit for drying the sludge or slurry using dry air for obtaining dry solid waste. The system also includes a ninth unit to remove the undesirable gases from exhaust air before releasing in the atmosphere.

7 Claims, 6 Drawing Sheets

SYSTEM 100

(51) Int. Cl.
    *C02F 1/04*          (2023.01)
    *C02F 1/12*          (2023.01)
    *C02F 1/16*          (2023.01)

(52) U.S. Cl.
    CPC ................. *C02F 1/12* (2013.01); *C02F 1/16*
    (2013.01); *C02F 2303/10* (2013.01)

(56) References Cited

U.S. PATENT DOCUMENTS

| | | | | |
|---|---|---|---|---|
| 6,299,775 | B1 * | 10/2001 | Elston | C02F 9/00 |
| | | | | 210/744 |
| 6,919,000 | B2 * | 7/2005 | Klausner | C02F 1/14 |
| | | | | 210/150 |
| 7,225,620 | B2 * | 6/2007 | Klausner | C02F 1/16 |
| | | | | 60/641.1 |
| 8,343,359 | B2 | 1/2013 | Daines et al. | |
| 8,425,668 | B2 * | 4/2013 | Lakatos | B03D 1/1462 |
| | | | | 95/266 |
| 8,889,013 | B1 * | 11/2014 | Coleman | C02F 1/16 |
| | | | | 210/764 |
| 9,834,454 | B2 * | 12/2017 | Frolov | B01D 3/007 |
| 9,834,455 | B2 * | 12/2017 | Frolov | B01D 3/007 |
| 10,144,655 | B2 * | 12/2018 | Becker | B01D 1/0041 |
| 10,294,123 | B2 * | 5/2019 | Lam | B01F 23/23123 |
| 10,414,670 | B2 * | 9/2019 | Becker | B01D 1/0035 |
| 10,829,913 | B1 * | 11/2020 | Ahmed | B01D 61/025 |
| 12,275,654 | B1 * | 4/2025 | Lawal | C02F 1/14 |
| 2005/0230238 | A1 * | 10/2005 | Klausner | C02F 1/04 |
| | | | | 203/DIG. 20 |
| 2010/0012557 | A1 | 1/2010 | Chaffee | |
| 2010/0314238 | A1 * | 12/2010 | Frolov | C02F 1/14 |
| | | | | 203/10 |
| 2011/0140457 | A1 * | 6/2011 | Lakatos | B03D 1/1462 |
| | | | | 210/639 |
| 2012/0228117 | A1 * | 9/2012 | Panunzio | C02F 9/00 |
| | | | | 203/10 |
| 2013/0118887 | A1 * | 5/2013 | Frolov | B01D 5/0027 |
| | | | | 202/185.1 |
| 2013/0146437 | A1 * | 6/2013 | Maurer | F28F 13/003 |
| | | | | 165/181 |
| 2016/0311710 | A1 * | 10/2016 | Duesel, Jr. | C04B 28/00 |
| 2017/0334736 | A1 * | 11/2017 | Lam | B01D 3/346 |
| 2018/0257949 | A1 | 9/2018 | Sbuelz | |
| 2019/0106336 | A1 * | 4/2019 | Becker | B01D 1/0035 |

* cited by examiner

SYSTEM 100

SOLAR THERMAL BASED WATER TREATMENT SYSTEM FOR IMPURE AND INDUSTRIAL WASTEWATER

FIELD OF THE INVENTION

The present invention relates to a water treatment system and more particularly to a solar thermal based water treatment system for impure and industrial wastewater.

BACKGROUND OF THE INVENTION

Wastewater treatment is primarily a process for removing impurities and contaminants from impure or industrial wastewater before releasing—it in a natural water body such as a river, sea or using it for other suitable applications such as watering plants, drinking. It is imperative that the wastewater from industries, households, agriculture, etc. is treated before reuse or released to curb water pollution.

United States Patent US20100012557A1 discloses a septic tank wastewater treatment system. The patent discloses a domestic wastewater treatment system using a septic tank and treatment compartment that separates solid waste from the wastewater before releasing the water into the ground or river. The drawback of this invention is that the invention is usable only for a small or singular household. Another drawback of this invention is that the treated water is not-potable.

French Patent FR2861718B1 discloses a system for treating aqueous effluent by means of oxidation and membrane filtration. The patent document discloses a system for wastewater treatment by eliminating organic material and filtering water. The drawback of this invention is that the treated water is non-potable. Another drawback of this invention is that the treated water is not recoverable.

Prior art suggests various systems and methods using chemicals for wastewater treatment. The drawback of these types of systems is that the chemical treatment produces significant carbon footprint. Another drawback of this type of process of treatment is that its performance is closely dependent on the type and composition of wastewater to be treated. Any variation in the quality of the input wastewater affects the quality of the treated water. Another drawback of this type of invention is that the treated water is not-potable for drinking use.

There is a need of a system for wastewater treatment that treats any type of impure/wastewater irrespective of the quality and composition of the impure/wastewater and purifies it into potable water without using chemicals, filters, membranes, microbes etc. to make the process sustainable. There is a further need of a system for wastewater treatment that uses renewable sources of energy.

SUMMARY OF THE INVENTION

A system for purifying wastewater with only air as a medium comprising a first unit pretreating industrial wastewater; a first pump driving wastewater from the first unit to a second unit and preheating pretreated wastewater using available waste heat. A third unit receiving preheated wastewater, a third pump recirculating wastewater inside the third unit. A fourth unit receiving warm moist air from third unit and less humid cold air from fifth unit and exchanging heat in the fourth unit. A fifth unit receiving cool moist air from the fourth unit and receiving chilled water from the sixth unit. A seventh unit receiving purified water from fifth unit. A tenth unit receiving purified water from seventh unit. An eighth unit receiving warm dry air from the fourth unit and sludge or slurry from third unit through a second pump. A ninth unit receiving exhaust air from the eighth unit.

A process for purifying industrial wastewater of system including steps of pretreating, wastewater with floating and large size suspended solids in a first unit. Preheating pretreated wastewater in a second unit using available waste heat. Vaporizing, preheated wastewater in a third unit. Water recovery, separating pure water from moist air received from third unit and delivering pure water to the seventh unit. Drying, the sludge or slurry in the eighth unit. Processing, exhaust air from eighth unit and warm moist air directly from third unit in the ninth unit. Exhausting, processed air in the atmosphere.

The process for purifying wastewater wherein, the steps of water recovery including Exchanging, heat from warm moist air with the less humid cold air in a fourth unit. Further cooling, the cool moist air in a fifth unit. Separating, purified water in the form of condensate in the fifth unit. Storing, purified water in a treated water storage tank. Pre-cooling, the warm moist air received from the third unit with the less humid cold air from the fifth unit inside the fourth unit.

The dry solid waste is obtained without the steps of water recovery. The second unit preheats the wastewater in the range of 5° to 10° C. The wastewater vaporizing inside the third unit through incident solar radiations and accelerating the vaporization process through forced water recirculation and ambient air circulation. The fourth unit cools the warm moist air in the range of 5° to 10° C. by exchanging heat with cold less humid air from fifth unit inside the fourth unit.

The fifth unit substantially cools the cool moist air in the range of 15° to 20° C. separating purified water in the form of condensate from the moist air. The less humid cold air exchanges heat with warm moist air inside the fourth unit. A system for purifying non-potable water from water bodies including a first pump, a second pump, a first storage, a second storage. A first unit receiving incident solar radiations, the first unit includes a first fan and a second fan, the first fan forcing ambient air in the first unit; the second fan extracting heated air from the first unit.

A plurality of hot air ducts connecting the first unit with the second unit; the second unit includes a sprinkler unit and water tubes. A third unit receiving purified water from the second storage tank. A process for purifying non-potable water comprising steps of Heating, ambient air through incident solar radiations in an enclosed environment inside the first unit. Sprinkling, non-potable water on the heated air tubes/ducts through sprinkler unit.

Vaporizing, through sprinkling cold water on the heated air tubes under vacuum conditions. Condensing, the vapors on the water tubes under vacuum conditions. Collecting, condensed purified water inside the first storage tank. Filtering, Disinfecting and Mineralizing purified water in the third unit.

BRIEF DESCRIPTION OF THE DRAWINGS

The objectives and advantages of the present invention will become apparent from the following description read in accordance with the accompanying drawings wherein.

DETAILED DESCRIPTION OF THE INVENTION

The invention described herein is explained using specific exemplary details for better understanding. However, the invention disclosed can be worked on by a person skilled in the art without the use of these specific details.

References in the specification to "one embodiment" or "an embodiment" means that particular feature, structure, characteristic, or function described in connection with the embodiment is included in at least one embodiment of the invention. The appearances of the phrase "in one embodiment" in various places in the specification are not necessarily all referring to the same embodiment.

References in the specification to "preferred embodiment" means that a particular feature, structure, characteristic, or function described in detail thereby omitting known constructions and functions for clear description of the present invention.

The foregoing description of specific embodiments of the present invention has been presented for purposes of illustration and description. They are not intended to be exhaustive or to limit the present invention to the precise forms disclosed, and obviously many modifications and variations are possible in light of the above teaching.

In general aspect, the present invention is a solar thermal based water treatment system that treats impure/industrial waste water to generate clean/potable water using solar energy.

Figure 1:
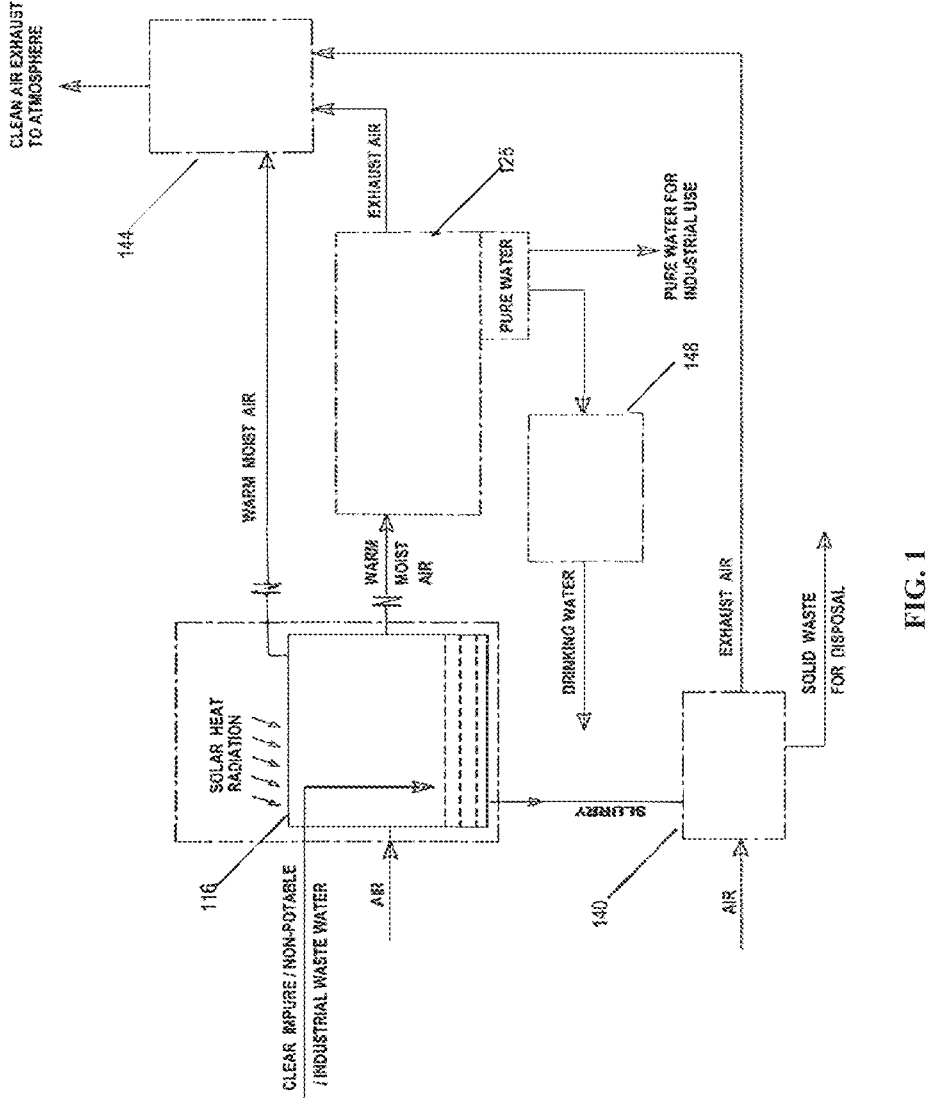
FIG. 1 shows a solar thermal based water treatment system in accordance with a preferred embodiment of the present invention.

Referring to FIG. 1, a solar thermal based water treatment system 100 in accordance with a preferred embodiment of the present is described. The solar thermal based water treatment system 100 (hereby referred to as "system") includes a third unit 116 i.e. a treatment unit, a water recovery unit 125, a ninth unit 144 i.e. a wet scrubber, and an eighth unit 140 i.e. a drying unit. The third unit 116 is defined by a thermal enclosure that receives clear impure/ industrial wastewater or non-potable wastewater, forced air and solar radiations.

The third unit 116 process the impure wastewater with only air as a medium and without using filters, membranes, microbial, chemicals and produces two outputs such as a first output i.e. warm moist air and a second output i.e. a slurry. The warm moist air is received by the water recovery unit 125 or the ninth unit 144 or by both simultaneously. The warm moist air received in the ninth unit 144 is processed to obtain pure water.

The obtained pure water is received by a tenth unit 148 i.e. a drinking water treatment unit. The tenth unit 148 further process the pure water to obtain drinkable purified water. The eighth unit 140 receives two inputs a first input i.e. forced air, a second input i.e. a slurry. The eighth unit 140 processes and releases dry solid waste into the environment. The eighth unit 140 also exhausts air into atmosphere through ninth unit 144.

Figure 1A:
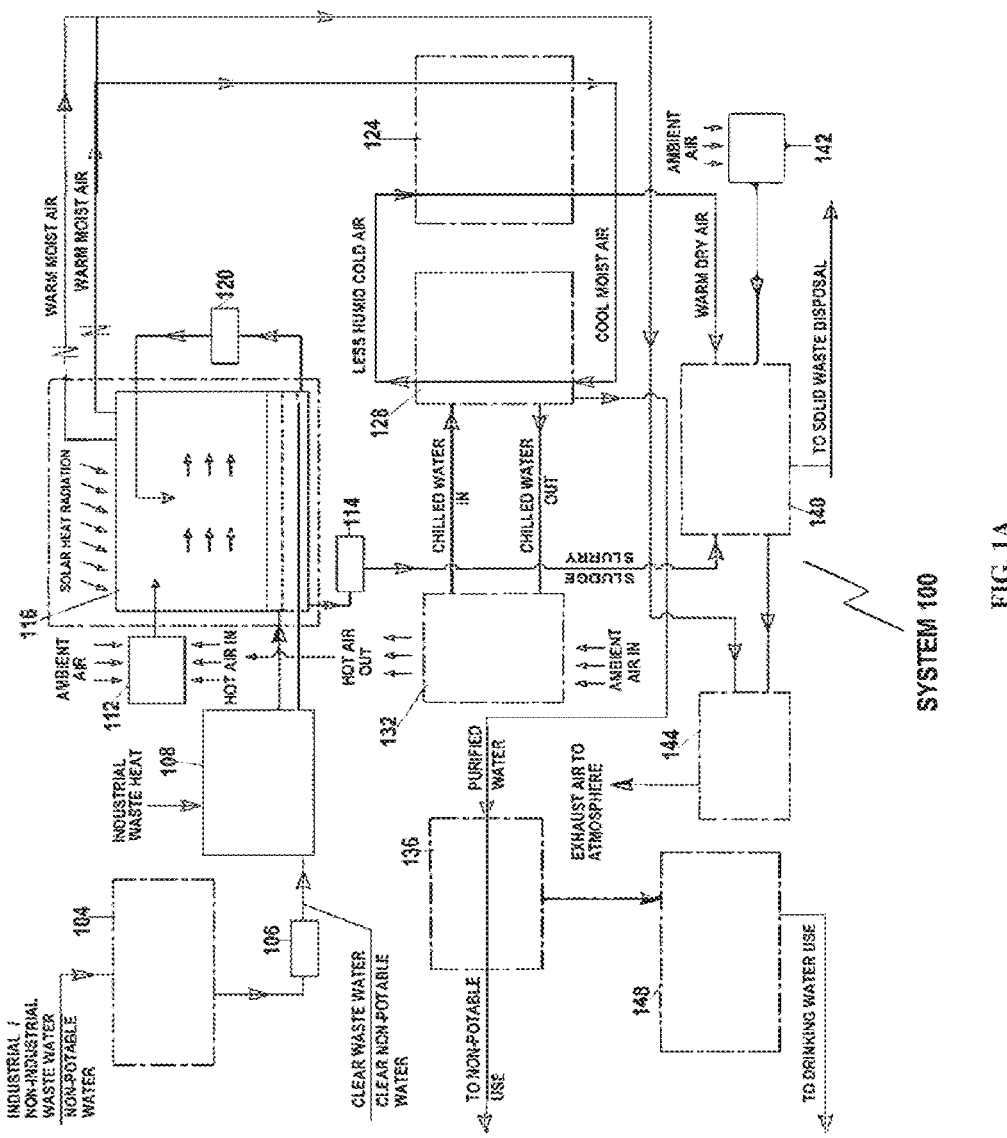
FIG. 1A shows a solar thermal based water treatment system in accordance with a preferred embodiment of the present invention of FIG. 1.

Referring to FIGS. 1 and 1A, a solar thermal based water treatment system 100 in accordance with a preferred embodiment of the present invention is described. The solar thermal based water treatment system 100 (hereby referred to as "system") includes a first unit 104 i.e., a pre-treatment unit, a second unit 108 i.e. a pre heating unit and the third unit 116 i.e. a treatment unit. The first unit 104 is a pre-treatment unit that receives impure or industrial waste and/or non-potable water.

The first unit 104 cleans the wastewater by separating various impurities, for example, floating solids, large size suspended solids and the like using screens or separation chamber. The treated clear waste water obtained through first unit 104, is stored in the storage tank (not seen).

A first pump 106 pumps water from the first unit 104 and delivers the water to the second unit 108. The second unit 108 preheats the received wastewater raising the temperature in the range of 5° to 10° C. using available waste heat. The third unit 116 is defined by a solar thermal enclosure that receives three inputs such as preheated water, forced air and solar radiations. The preheated water is received from the second unit 108. The air (ambient or from other sources) is received through a first air blower 112. The solar radiations are received from the ambient atmosphere.

In accordance with the present invention, the third unit 116 has a first output i.e., warm moist air containing water vapor and a second output i.e., sludge or slurry. The forced air and heat from the solar radiations vaporize the circulating wastewater inside the third unit 116. The sludge or slurry containing for example, dissolved or suspended impurity, microbial and the like is pumped out through a second pump 114. A third pump 120 circulates wastewater inside the third unit 116.

The water recovery unit 125 also includes a fourth unit 124 i.e. a first heat exchanger unit and a fifth unit 128 i.e. a second heat exchanger unit. The system 100 further includes a sixth unit 132 i.e. an air cooled water chiller unit and a seventh unit 136 i.e. treated water storage tank. The fourth unit 124 receives warm moist air from the third unit 116 through connecting air duct. The fourth unit 124 also receives less humid cold air from fifth unit 128 through connecting air duct.

It is to be noted that, the warm moist air received from the third unit 116 exchanges heat with the less humid cold air received from fifth unit 128. The fourth unit 124 advantageously reduces the temperature of warm moist air in the range of 5° to 10° C. The fourth unit 124 has two outputs such as a first output i.e. a cool moist air and a second output i.e. a warm dry air. The first output is received by the fifth unit 128 and the second output is received by the eighth unit 140. The fourth unit 124 increases temperature of less humid cold air in the range of 5° to 10° C. because of heat transfer from warm moist air stream and in effect produces warm dry air as second output.

The fifth unit 128 receives two inputs such as a first input i.e. a cool moist air and a second input i.e. a chilled water.

The cool moist air is received from the fourth unit 124 as first input and the chilled water at about 6° to 10° C. as second input is received from the sixth unit 132. The incoming chilled water exchanges heat with the cool moist air that is received from the fourth unit 124 accordingly, the air is cooled in the range of 15° to 20° C. The cooling of moist air to the super saturation level extracts moisture from the cooled air and advantageously separates the purified water from cool air in form of condensate.

In accordance with the present invention, the fifth unit 128 has three outputs i.e. a first output is purified water, a second output i.e. less humid cold air and a third output i.e. return chilled water at about 10° to 14° C. The first output i.e. the purified water is received by the seventh unit i.e. storage tank 136. Similarly, the second output i.e. less humid cold air is received by the fourth unit 124. The third output i.e. return chilled water is received back by the sixth unit 132.

In context of the present invention, the fourth unit 124 receives the less humid cold air from the fifth unit 128. The less humid cold air exchanges heat with the warm moist air received from the third unit 116. The warm and dry air discharged from the fourth unit 124 is received by the eighth unit 140. The eighth unit 140 receives three inputs a first input i.e. a sludge or slurry, a second input i.e. warm dry air and a third input i.e. additional forced ambient air. The sludge or slurry is received from third unit 116 through a second pump 114. The warm dry air is received from fourth unit 124 and the additional ambient air is received through second air blower 142.

The eighth unit 140 releases the received sludge for safe disposal. The eighth unit 140 removes moisture content from sludge or slurry by passing over it the received warm dry air and additional ambient air. The dry sludge is discharged by eighth unit 140 as first output for disposal as solid waste. The exhaust air is released from the eighth unit 140 as second output and is received by the ninth unit 144.

The ninth unit 144 i.e. wet scrubber forces the received exhaust air through the shower of recirculating fresh water. The physical interaction of exhaust air and water reduces the content of undesirable gases present in the received exhaust air. The exhaust air is further released safely in the atmosphere.

The tenth unit 148 receives purified water from the seventh unit 136. The tenth unit 148 treats the purified water with filtration, disinfection, and mineralization techniques to obtain drinkable water from the purified water.

Now referring to FIG. 1A, a process for obtaining purified water from the wastewater is described. In an initial step, the impure or industrial wastewater along with floating or large size suspended solids is received by the first unit 104. In this step, the floating and large size suspended solid material is separated from the wastewater and then the clear wastewater is stored in the storage tank (not seen). In a next step, the clear wastewater is received by the second unit 108. In this step, the second unit 108 heats the wastewater using the available industrial waste heat raising, the temperature of waste water in the range of 5° to 10° C.

In a next step, the heated water is received by the third unit 116 from the second unit 108. In this step, the first air blower 112 forces ambient air inside the third unit 116. In this step, the solar radiations are absorbed by the third unit 116. In this step, the third pump 120 circulates the wastewater inside the third unit 116. In this step, the heated wastewater evaporates due to simultaneous interaction of the warm air, heat absorbed from incident solar radiations, forced air circulation and forced water recirculation.

In accordance with the present invention, the wastewater is evaporated through warm air. The process of wastewater evaporation is accelerated through forced air circulation and forced wastewater recirculation. In this step, enhanced air water recirculation is attained through simultaneous intense interaction of the warm air, forced air circulation and forced water recirculation.

In accordance with this one preferred embodiment of the present invention, the warm moist air is released from the third unit 116 and received by the fourth unit 124 and the ninth unit 144 respectively as per user requirement. The warm moist air received by the ninth unit 144 is forced through a wet scrubber and released into the atmosphere. Accordingly, the warm moist air received by the fourth unit 124 is further processed to obtain purified water.

In an initial cycle of this one preferred embodiment of the present invention, the hot humid air released from the third unit 116 passes through the fourth unit 124 and is received by the fifth unit 128. The fifth unit 128 receives chilled water from the sixth unit 132 such that the warm moist air received from the fourth unit 124 is cooled by exchanging heat with said chilled water. In the subsequent cycle of this one preferred embodiment of the present invention, the fourth unit 124 receives less humid cold air from fifth unit 128.

Accordingly, the subsequent streams of warm moist air exchange heat with less humid cold air in the fourth unit 124. In a next step, as a result of this heat exchange the warm moist air is cooled to cold moist air and the less humid cold air is heated to warm dry air. Accordingly, the cool moist air and warm dry air are generated inside the fourth unit 124.

In a next step, the fifth unit 128 further cools the received cool moist air to super saturation level by the incoming chilled water received from sixth unit 132. In this step, the fifth unit 128 extracts the moisture from the cooled moist air to super saturation level and separates the purified water from the air in the form of condensate. In this step, the purified water is collected in the form of condensate and stored inside the treated water storage tank 136.

In a next step, the purified water in the form of condensate is stored in the seventh unit 136. The purified water is either used for non-potable use or is received by the tenth unit 148. In a next step, the tenth unit 148 obtains drinkable water by treating the purified water through filtration, disinfection and mineralization techniques.

The drinkable treated water is received from the tenth unit 148. In a next step, the less humid cold air received from the fifth unit 128 pre-cools the hot moist air stream received from the third unit 116 inside the fourth unit 124. In this step, the warm dry air generated by exchanging heat between the less humid cold and the hot moist air stream is received by the eighth unit 140. In a next step, the eighth unit 140 receives ambient air from the second air blower 142, the sludge or slurry from the third unit 116 and the warm dry air from the fourth unit 124.

In this step, the dried sludge is released in the form of solid waste for further disposal, and the ambient air with warm dry air removes moisture from the sludge or slurry. In this step, the exhaust air from eighth unit 140 is received by the ninth unit 144. In a final step, the ninth unit 144 forces the exhaust air through a wet scrubber and releases into the atmosphere.

In context of the present invention, the preferred process of purifying impure and industrial wastewater is described. In the first unit 104 the floating and large size suspended solid matter is separated from the waste water. In the second unit 108, the clear wastewater is preheated to a predefined temperature using available waste heat. In the third unit 116, the wastewater is vaporized through warm air using heat from solar radiations. In the third unit 116, the process of vaporization is accelerated through forced air circulation and forced water recirculation.

In the fourth unit 124 the warm moist air is received from third unit and less humid cold air is received from fifth unit. In the fourth unit 124, the heat exchange takes place which reduces the temperature of warm moist air and produces cool moist air. Simultaneously, it increases the temperature of less humid cold air and produces warm dry air. The fifth unit 128 receives cool moist air and further reduces the temperature of air to the super saturation level by exchanging heat with incoming chilled water from sixth unit 132. In the fifth unit 128 the purified water is obtained in the form of condensate and collected and stored inside the treated water storage tank 136. The warm dry air from fourth unit 124 is received by the eighth unit 140. The eighth unit 140 removes moisture from sludge or slurry and releases the exhaust air through the ninth unit 144 into the atmosphere.

Figure 1B:
FIG. 1B shows an example of raw effluent that is treated to obtain purified water in accordance with a preferred embodiment of the present invention of FIG. 1.
Figure 1C:
FIG. 1C shows an example of dried solid waste remains in accordance with a preferred embodiment of the present invention of FIG. 1B.
Figure 1D:
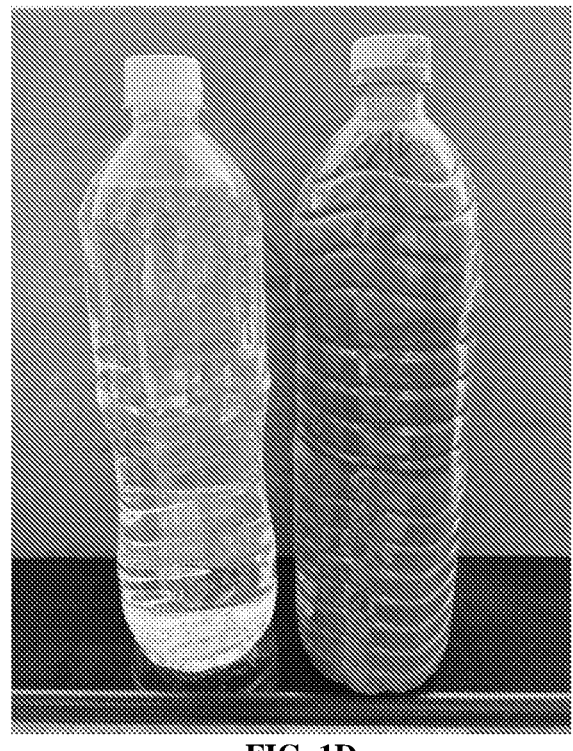
FIG. 1D shows another example of raw effluent that is treated to obtain purified water in accordance with a preferred embodiment of the present invention of FIG. 1.
Figure 1E:
FIG. 1E shows another example of dried solid waste in accordance with a preferred embodiment of the present invention of FIG. 1D.
Figure 1F:
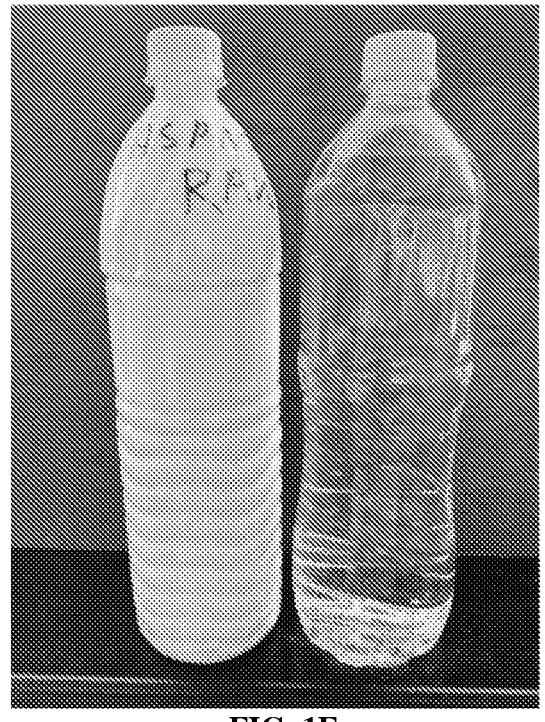
FIG. 1F shows another example of raw effluent that is treated to obtain purified water in accordance with a preferred embodiment of the present invention of FIG. 1.
Figure 1G:
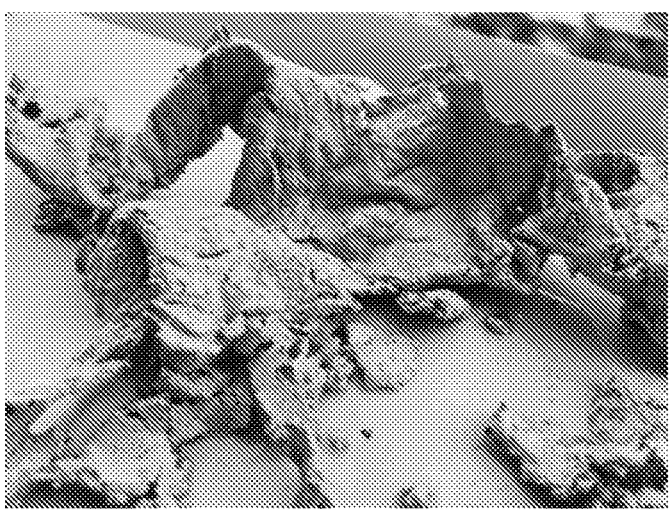
FIG. 1G shows another example of dried solid waste in accordance with a preferred embodiment of the present invention of FIG. 1F.

Now referring to FIGS. 1B and 1C, an example of experimental analysis for obtaining purified water from pharmaceutical effluent is described in accordance with this one preferred embodiment of the present invention. On 23 and 24 Feb. 2022, 50 liters of pharmaceutical effluent was tested in a pilot unit to achieve zero liquid discharge condition for a total of about 24 hours starting at 10 am until 10 pm in the night on both the days. At the end of the process about 5% (by volume) of thick slurry was produced and was further dried to get dry solid waste of about 100 grams.

Now referring to FIGS. 1D-1G, an experimental analysis of obtaining purified water from paint industry effluents is described in accordance with this one preferred embodiment of the present invention. Two zero liquid discharge tests were performed on the paint industry effluents, $1^{st}$ on on 28 Dec. 2021 with red color effluent (refer FIGS. 1D-1E) and $2^{nd}$ on 3 Jan. 2022 with yellow color effluent (refer FIGS. 1F-1G). The tests were performed with about 22 liters of effluent each. The trial with the red colored effluent started at around 8 am and ran for about 14 hours. The trial with the yellow-colored effluent started at around 10 am and ran for about 12 hours. About 10% thick slurry by volume was obtained and further dried to achieve solid dry waste about 1 kg each.

Figure 2:
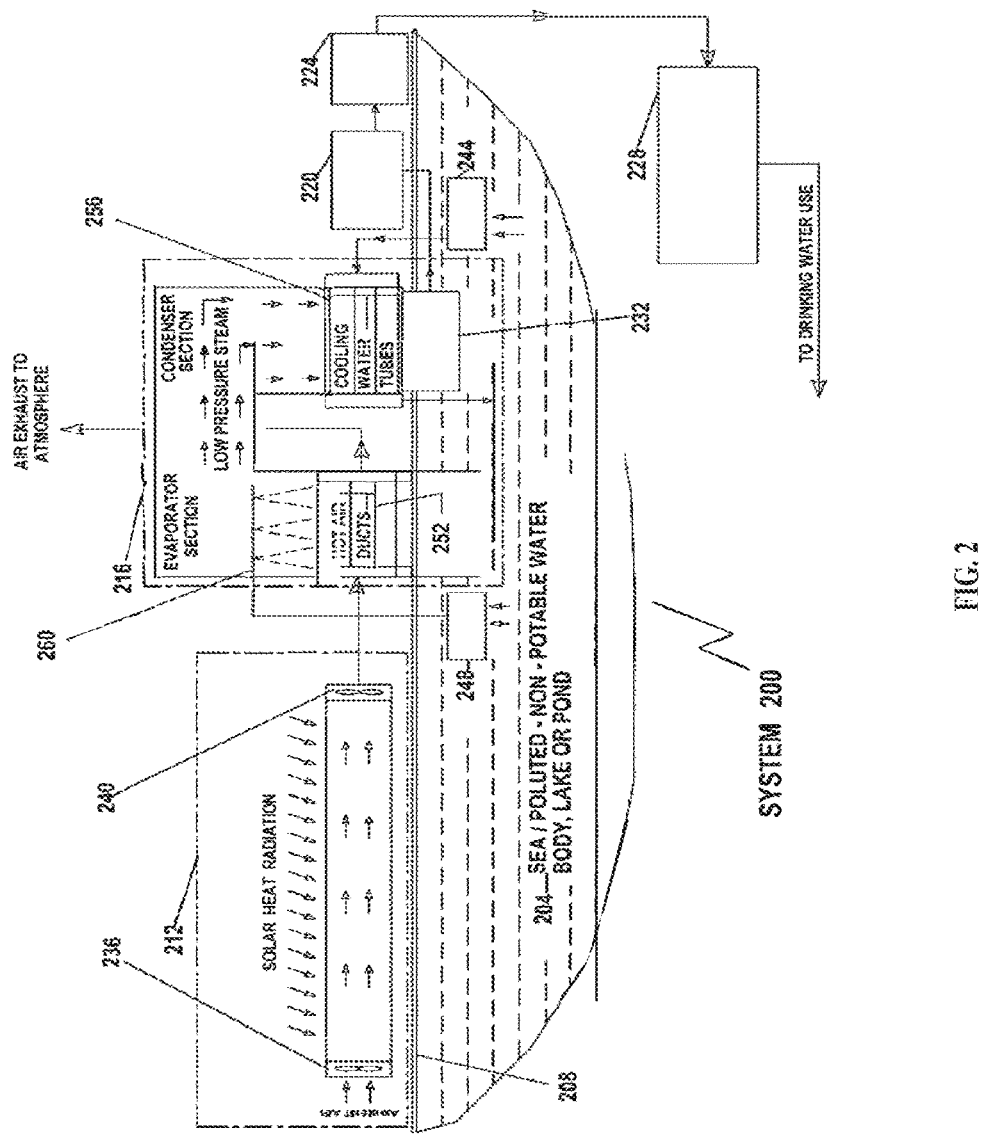
FIG. 2 shows another embodiment of the solar thermal based water treatment system of FIG. 1.

Referring to FIG. 2 a second embodiment 200 of the solar thermal based water treatment system 200 is described. The system 200 is preferably placed on a large water body 204 for e.g. sea, lake, and the like. The system 200 includes a floating platform 208, a first unit 212 i.e. a solar unit, a second unit 216 i.e. a vacuum enclosure and a third unit 228 i.e. a drinking water treatment unit.

The first unit 212 includes a first fan 236 and a second fan 240. The first unit 212 is heated by receiving incident solar radiations. The first fan 236 forces ambient air inside the first unit 212 and the second fan 240 extracts the heated air from the first unit 212.

The second unit 216 further includes an evaporator section and a condenser section. The evaporator section further includes a plurality of air ducts, air tubes 252 and a sprinkler unit 260. The plurality of tubes, air ducts 252 receive hot air from the first unit 212, pass the hot air through the air tubes/ducts of evaporator section of the second unit 216 and exhaust the air to atmosphere after exchanging heat with impure water sprinkled on it. The condenser section further includes a plurality of water tubes 256.

A first storage tank 232 stores condensed purified water. A vacuum pump 220 extracts the condensed water from the first storage tank 232 and delivers in a second storage tank

224. The vacuum pump 220 creates and maintains vacuum inside the second unit 216. The third unit 228 receives purified water from the second storage tank 224. The third unit 228 treats the purified water with filtration, disinfection, and mineralization techniques to obtain drinkable water from purified water.

Referring to FIG. 2, the process of obtaining purified water from impure, polluted, non-potable wastewater of this preferred embodiment is described. In an initial step, ambient air is forced in the first unit 212 through the first fan 236. In this step, the first unit 212 receives incident solar radiations that heats the exposed surfaces of first unit 212. In this step, the incident solar radiations heat the ambient air received from the first fan 236 inside the first unit 212 at a temperature rise of up to 10° C. over ambient temperature In a next step, the second fan 240 extracts heated air from the first unit 212 and forces it through plurality of air ducts 252 from the first unit 212 and passes through evaporator section of the second unit 216. In a next step, the evaporator section of the second unit 216 receives heated air through plurality of hot air ducts or pipes 252. In this step, the first pump 248 pumps the non-potable water from sea or water body or lake 204 over the hot air ducts 252 through the sprinkler unit 260.

In this step, the sprinkler unit 260 continuously sprays the non-potable water from the water bodies 204 on the hot air ducts. In this step, the heated air from the air ducts 252 exchanges heat with the non-potable water sprayed through the sprinkler unit 260 causing evaporation under vacuum conditions. In this step the water vapors so formed pass to the condenser section of second unit 216.

In a next step, the second pump 244 pumps non-potable water from the water body 204 in the water tubes 256. In a next step, the water vapors in the evaporation section are received in condenser section. In a next step, the water vapors pass over the water tubes 256. In this step, the latent heat of water vapors is absorbed with the non-potable water inside the water tubes 256 causing condensation of water vapors under vacuum conditions.

In accordance with this preferred embodiment, the second unit 216 has a first output i.e. a condensate, a second output i.e. heated water, and a third output i.e. cool exhaust air. In this step, the condensate is collected inside a first storage tank 232, the heated water is released back into the water body 204 and the cool exhaust air is released in the atmosphere.

In a next step, the vacuum pump 220 pumps the collected condensed water from the first storage tank 232 and delivers inside the second storage tank 224 at the same time maintains vacuum in the second unit 216. In a next step, the purified water stored inside the second storage 224 is received by the third unit 228. In a final step, the third unit 228 treats the purified water with filtration, disinfection and mineralization techniques to obtain drinkable water from the purified water.

In yet another embodiment of the system 100, the system 100 includes multiple thermal enclosures on top of each other in an vertical arrangement to reduce the footprint, a solar energy storage system, a device using cold water drawn from certain depths in the water bodies to take advantage of the thermal stratification, a portable system that is transportable by various means or installing the system partly or fully on a platform over a water body.

These embodiments work in singular or combination as per requirement with the solar thermal based impure and wastewater treatment system 100.

In yet another embodiment of the system 100, the system is installed away from an impure water resource in faraway remote places and the required impure water from water bodies such as lakes, rivers, sea etc. is pumped, stored and supplied to the system 100 for processing.

In yet another embodiment of the system 100, the system 100 is installed and used in part or fully based on the application.

In yet another embodiment of the system 100, the system is used to evaporate, separate and condense certain chemicals in the water with boiling points less than 100° C.

The solar thermal based impure and wastewater treatment system 100 of the present invention effectively works in absence of solar incident radiation at the reduced efficiencies due to the reduced capacity of the air in the enclosure to absorb water vapors during non-sunny conditions.

In another embodiment of the present invention, necessary properties of the ambient air, and of the air in the enclosure, such as dry/wet bulb temperature, relative humidity, flow rates etc. properties of wastewater such as temperature, flow rate, water level, Chemical Oxygen Demand, Biological Oxygen Demand, Total Dissolved Solids, Total Suspended Solids etc. intensity of the solar incident radiation, are monitored using sensors at a controller location to optimize the evaporation and extraction of pure water from the wastewater. Further an IoT (Internet of Things) based system can be deployed to collect sensor data, store it on a cloud storage and process it on the cloud as necessary using data analytics techniques to further improve the process.

The solar thermal based water treatment system 100 of the present invention is advantageously a thermal water treatment operating at near atmospheric pressure and temperature that is preferably used for treating impure and wastewater from any source for generating potable water. The present invention 100 advantageously prevents usage of any chemicals, filters, membranes, microorganisms etc. resulting in a smaller carbon footprint and generic simpler process.

The present invention 100 advantageously uses solar energy for treatment process. The solar thermal based water treatment system 100 of the present invention is advantageously scalable and cost effective. The present invention 100 advantageously obtains dry solid waste with or without the steps of water recovery.

In yet another embodiment of the system 100, the solid waste is used to create useful value added products such as bricks, crystallized salt, compost, or used to extract precious minerals/metals etc. depending on the type of solid waste.

The embodiments were chosen and described in order to best explain the principles of the present invention and its practical application, to thereby enable others, skilled in the art to best utilize the present invention and various embodiments with various modifications as are suited to the particular use contemplated.

It is understood that various omission and substitutions of equivalents are contemplated as circumstance may suggest or render expedient, but such are intended to cover the application or implementation without departing from the scope of the present invention.

The invention claimed is:

1. A system for purifying impure, industrial wastewater, the system comprising:
   a first unit for pre-treating the wastewater; a first pump driving the wastewater from the first unit to a second unit, and preheating the pretreated wastewater using waste heat;
   a third unit for receiving the preheated pretreated wastewater, ambient air and solar radiation; a first air blower for forcing the ambient air into the third unit; a third pump for forced re-circulation of the preheated pretreated wastewater into the third unit wherein the solar radiation causes vaporization of the preheated pretreated wastewater and the forced ambient air circulation and forced water recirculation accelerates the vaporization;
   a fourth unit receiving warm moist air from the third unit and cold air from a fifth unit to exchange heat in the fourth unit;
   the fifth unit receiving cool moist air from the fourth unit and receiving chilled water from a sixth unit to generate purified water;
   a seventh unit receiving the purified water from the fifth unit;
   a tenth unit receiving the purified water from the seventh unit;
   a eighth unit receiving warm dry air from the fourth unit and sludge or slurry from the third unit through a second pump; and
   a ninth unit receiving exhaust air from the eighth unit and processing the exhaust air before releasing to the atmosphere.

2. A process for purifying impure, industrial, wastewater, the process comprising:
   a. pre-treating the wastewater with floating and large size suspended solids in a first unit;
   b. pre-heating the pretreated wastewater in a second unit using available waste heat;
   c. vaporizing the preheated pretreated wastewater in a third unit by incident solar radiation, and accelerating the vaporization by forced recirculation of water and by forced circulation of ambient air;
   d. separating pure water from moist air received from the third unit leading to recovery of pure water and delivering the pure water through a fourth unit and a fifth unit to a seventh unit;
   e. drying sludge or slurry obtained from the third unit in an eighth unit;
   f. processing exhaust air from the eighth unit and warm moist air directly from the third unit in a ninth unit; and
   g. exhausting the processed air in the atmosphere.

3. The process according to claim 2, wherein the recovery of pure water comprises:
   a. exchanging heat from the moist air with the cold air in the fourth unit;
   b. cooling the cool moist air further in the fifth unit;
   c. separating pure water in the form of condensate in the fifth unit;
   d. storing the pure water in a treated water storage tank; and
   e. pre-cooling the warm moist air received from the third unit with the cold air from the fifth unit inside the fourth unit.

4. The process according to claim 2 wherein the second unit preheats the wastewater in the range of 5° to 10° C.

5. The process according to claim 3 wherein the fourth unit cools the warm moist air in the range of 5° to 10° C. by exchanging heat with cold less humid air from the fifth unit inside the fourth unit.

6. The process according to claim 3 wherein the fifth unit cools the cool moist air further in the range of 15° to 20° C. separating purified water in the form of condensate from the moist air.

7. The process according to claim 3 wherein the less humid cold air exchanges heat with warm moist air inside the fourth unit.

* * * * *